US008284281B2

(12) United States Patent
Verdant

(10) Patent No.: US 8,284,281 B2
(45) Date of Patent: Oct. 9, 2012

(54) METHOD FOR READING A TWO-DIMENSIONAL MATRIX OF PIXELS AND DEVICE FOR IMPLEMENTING SUCH A METHOD

(75) Inventor: Arnaud Verdant, La Tour du Pin (FR)

(73) Assignee: Commissariat a l'Energie Atomique, Paris (FR)

( * ) Notice: Subject to any disclaimer, the term of this patent is extended or adjusted under 35 U.S.C. 154(b) by 767 days.

(21) Appl. No.: 12/250,720

(22) Filed: Oct. 14, 2008

(65) Prior Publication Data
US 2009/0115877 A1 May 7, 2009

(30) Foreign Application Priority Data
Nov. 5, 2007 (FR) ...................................... 07 58792

(51) Int. Cl.
  *H04N 3/14* (2006.01)
  *H04N 5/335* (2011.01)
  *H04N 7/18* (2006.01)
  *H01L 31/062* (2012.01)
  *H01L 31/113* (2006.01)
  *H01L 27/00* (2006.01)
(52) U.S. Cl. ...................... 348/294; 348/154; 250/208.1; 257/292
(58) Field of Classification Search ............... 348/222.1, 348/241, 294–324, 154; 250/208.1; 257/291–293
See application file for complete search history.

(56) References Cited

U.S. PATENT DOCUMENTS

| 5,257,058 | A * | 10/1993 | Mabuchi ......................... 396/71 |
| 5,703,639 | A * | 12/1997 | Farrier et al. .................. 348/241 |
| 6,366,317 | B1 * | 4/2002 | Mattison et al. ............... 348/241 |
| 6,512,218 | B1 * | 1/2003 | Canini et al. ................. 250/208.1 |
| 6,993,158 | B2 * | 1/2006 | Cho et al. ........................ 382/103 |
| 2002/0041631 | A1 * | 4/2002 | Arita et al. ............... 375/240.16 |
| 2002/0126211 | A1 * | 9/2002 | Kitajima ...................... 348/220.1 |
| 2004/0095492 | A1 * | 5/2004 | Baxter et al. .................. 348/302 |
| 2004/0141067 | A1 * | 7/2004 | Nakayama et al. ........ 348/222.1 |
| 2004/0141074 | A1 * | 7/2004 | Milkov et al. ................. 348/296 |
| 2005/0041156 | A1 * | 2/2005 | Kondo et al. ................. 348/700 |
| 2005/0128327 | A1 * | 6/2005 | Bencuya et al. ............. 348/308 |
| 2005/0145777 | A1 * | 7/2005 | Barna et al. ................. 250/208.1 |
| 2005/0243183 | A1 | 11/2005 | Obrador |
| 2006/0001753 | A1 * | 1/2006 | Funakoshi et al. ............ 348/308 |
| 2006/0062483 | A1 * | 3/2006 | Kondo et al. ................. 382/253 |
| 2006/0119903 | A1 | 6/2006 | Chiba et al. |
| 2006/0227228 | A1 | 10/2006 | Nam |
| 2006/0249658 | A1 * | 11/2006 | O'Grady ................... 250/214 R |
| 2007/0133068 | A1 * | 6/2007 | Yu ................................. 358/482 |
| 2009/0121137 | A1 * | 5/2009 | Liddiard .................... 250/338.1 |

FOREIGN PATENT DOCUMENTS

| WO | 02/089467 A1 | 11/2002 |
| WO | 2004/107728 A2 | 12/2004 |

* cited by examiner

*Primary Examiner* — Usman Khan
*Assistant Examiner* — Tuan Le
(74) *Attorney, Agent, or Firm* — Burr & Brown

(57) ABSTRACT

The invention relates to a method for reading a two-dimensional matrix of pixels of an image sensor, the matrix being organized in blocks of pixels forming macropixels, each macropixel being readable independently of one another in high resolution mode and/or in low resolution mode. The method includes the steps of, during the selection of the high resolution readout mode for a macropixel, in reading and storing the values of the pixels thereof, in order to define a reference macropixel, and during the subsequent high resolution readout cycles of this macropixel, in forming the difference between the read values of the pixels thereof and the values of the corresponding pixels of the reference macropixel.

5 Claims, 3 Drawing Sheets

METHOD FOR READING A TWO-DIMENSIONAL MATRIX OF PIXELS AND DEVICE FOR IMPLEMENTING SUCH A METHOD

FIELD OF THE INVENTION

The invention relates to the general field of the readout of an image sensor in subresolution mode, in particular in the context of the detection and tracking of targets in a stream of images from said sensor.

More particularly, the present invention relates to a method and a device for reading a two-dimensional matrix of pixels of an image sensor, in which the pixel matrix is organized in blocks of pixels constituting macropixels, each macropixel being readable in high resolution mode and/or low resolution mode.

BACKGROUND OF THE INVENTION

During a sensing application or in connection with the tracking of moving objects by a digital camera, it is customary to use a mode for reading the sensor thereof called "subresolution" mode.

In the context of the present invention, movement means rapid and wide variations in luminosity of a portion of the image, induced, inter alia, by an actually moving object of the real world, or by the variation in luminosity of a light source, like a flashing light, for example.

This type of "subresolution" readout consists in subdividing the two-dimensional matrix of light sensitive elements of the camera or pixels, into blocks (referred to as "macropixels") and in reading all the pixels of the macropixels (referred to as high resolution readout mode) of a predefined zone of the matrix comprising the moving object. The other macropixels are then read in low resolution mode, consisting for example in reading only one pixel per macropixel.

This composite readout mode, that is a high resolution read out of the macropixels of interest, and the low resolution readout of the other macropixels, thus has the effect of substantially reducing the quantity of data to be processed. This therefore leads to lower power consumption and a lesser need for computation resources.

Such a readout mode is described for example in document US-A-2004/0095492. In this document, high resolution is applied to a target object. For example, a detection mode is used to find a light spot in the image and to determine the elements thereof to be read in high or low resolution. The update of the high resolution zone is then determined by analyzing the movement on the basis of the pixels read in high resolution mode.

The detection or tracking of moving objects has a particular application in the field of infrared viewing using a digital camera having a bolometric sensor. In fact, the use of such a camera, which is sensitive to infrared, allows surveillance of areas, such as parking lots for example, independently of the time of day, unlike visible detectors which require sufficiently lighted scenes.

Bolometric sensors are devices arranged in matrix form, and capable of operating at ambient temperature, that is not requiring any cooling to very low temperatures.

These uncooled sensors conventionally use the variation of a physical quantity of an appropriate material, as a function of temperature, in the neighborhood of 300K. In the case of bolometric sensors, this physical quantity is the electrical resistivity.

Sensors for infrared imagery are conventionally made in the form of a matrix of elementary sensors, or bolometers, said matrix being suspended above a substrate, generally made from silicon, via support arms.

Means for sequential addressing of the elementary sensors and of the means of electrical excitation and for preprocessing the electrical signal generated by these elementary sensors, are usually arranged in the substrate. This substrate and the integrated means are commonly referred to as the "readout circuit".

In fact, bolometers are observed to display a dispersion of their response, a dispersion which is also accentuated or varies over time.

Thus, the image of a uniform scene by a bolometric sensor is generally not a uniform image. This situation is referred to as "offset" dispersion. Similarly, a dispersion is observed in the gains of the bolometers, since the bolometric sensor image of a uniform variation of a uniform scene is not uniform.

There are many reasons for such a dispersion, but mention can be made in particular of the illumination of the sensor by a high flux, as for example during the observation of an intense radiation source (sun, floodlight, etc.), which causes a phenomenon of durable afterglow, which is detrimental to the quality of the thermal images delivered by the sensor.

Also worth mentioning is the fact that, among a given batch of imaging bolometers, a natural dispersion exists in the electrical resistances, which is more or less pronounced according to the method and the materials used for the fabrication thereof. Hence, from its initial use, a sensor comprises a spatial dispersion of its detection characteristics.

In fact, a 1% deviation of the electrical resistance of an imaging bolometer from a reference resistance causes an error of about 10 to 20% in the temperature of the scene estimated through it.

Since, furthermore, the value of the useful signal only usually accounts for about 10% of the total dynamic range of the bolometric sensor, it can be easily understood that the dispersion of the detection characteristics of the bolometric sensor seriously jeopardizes detection quality.

In general, it is observed that an uncorrected image of a bolometric sensor is difficult to use visually.

SUMMARY OF THE INVENTION

It is the object of the present invention to solve the above-mentioned problem by proposing a method for subresolution readout of a matrix of detectors, which substantially eliminates the effect of the dispersion of the detection characteristics of the sensors, thereby permitting easier use of the images issuing from these sensors, or even a visible use of these images.

For this purpose, the invention relates to a method for reading a two-dimensional matrix of pixels of an image sensor, the matrix being organized in blocks of pixels forming macropixels, each macropixel being readable independently of one another in high resolution mode and/or low resolution mode.

According to the invention, this method comprises the steps of:
  during the selection of the high resolution readout mode for a macropixel, in reading and storing the values of the pixels thereof, in order to define a reference macropixel;
  during the subsequent high resolution readout cycles of this macropixel, in forming the difference between the read values of the pixels thereof and the values of the corresponding pixels of the reference macropixel.

In the context of the present invention, pixel means the elementary detection component constituting the detection matrix, for example a bolometer in the case of a bolometric sensor or photodiode in the case of a visible sensor.

In other words, a macropixel acquired in high resolution is corrected by the value of these pixels acquired at the time of activation of the high resolution readout mode.

If we consider the value $P_0$ of a pixel of this macropixel at this moment, this value is composed of a useful signal $p_0$ and a non-useful value $D_0$, considered as noise. In other words, we have the expression: $P_0=p_0+D_0$.

During a subsequent read cycle, for example at time n, the corrected value $P_n^c$ of this pixel is then equal to $P_n^c=P_n-P_0=(p_{0+n}+D_{0+n})-(p_0+D_0)$, where $p_n$ and $D_n$ are the useful signal and the noise at time n respectively.

Since the time constant of the noise D is essentially that of the dispersions of the response of the pixels, that is essentially the ambient temperature in the case of a bolometric sensor, it is observed that for most of the scenes observed (for example a parking lot with a pedestrian or a moving car), the variation in noise D is substantially negligible during the time for high resolution readout of the macropixel. It is thus observed that the value $D_n$ of the noise at time n is generally substantially equal to the value $D_0$ at the time of activation of the high resolution readout. In consequence, the value of the corrected pixel $P_n^c$ is substantially equal to $P_n^c=p_{0+n}-p_0$.

Thus, the corrected values of the macropixel read in high resolution are substantially independent of the dispersion of the detection characteristics of the pixels forming this macropixel.

According to a particular embodiment of the invention, the storage of the reference macropixel and the formation of the difference are implemented in analog form. Preferably, the method comprises a step of analog-to-digital conversion of the values read of the macropixels, carried out after the step of formation of the difference.

In other words, the correction is made analogically, before any analog-to-digital conversion of the values of the macropixel. This allows in particular a rapid correction and, for example, the application of an analog-to-digital conversion of a dynamic range adapted to that of the difference, and therefore a smaller dynamic range than the one adapted to the uncorrected value of the pixel. Energy can thus be saved.

According to a preferred embodiment of the invention, the high resolution readout mode of a macropixel is selected when a movement is detected therein or when a movement is detected in a neighboring macropixel.

Thanks to the high resolution readout mode of a neighborhood of a macropixel in which a movement has been detected, "ghost" objects and image motion phenomena are thereby avoided.

The invention also relates to a device for reading a two-dimensional matrix of pixels of an image sensor, the matrix being organized in blocks of pixels forming macropixels, the device comprising means for reading each macropixel in high resolution mode and/or in low resolution mode.

According to the invention, this device comprises:
means for storing the values of the pixels of a macropixel when the high resolution readout mode is selected for it, in order to define a reference macropixel; and
means for forming the difference between the read values of the pixels of this macropixel and the values of the corresponding pixels of the reference macropixel.

This device is suitable for implementing the abovementioned method.

According to particular embodiments, the means for storing and forming the difference are produced in analog form.

Preferably, the device comprises means for analog-to-digital conversion of the difference formed.

BRIEF DESCRIPTION OF THE DRAWINGS

The invention will be better understood from a reading of the following description, provided exclusively as an example, and in conjunction with the appended drawings in which.

DETAILED DESCRIPTION OF THE INVENTION

Figure 1:
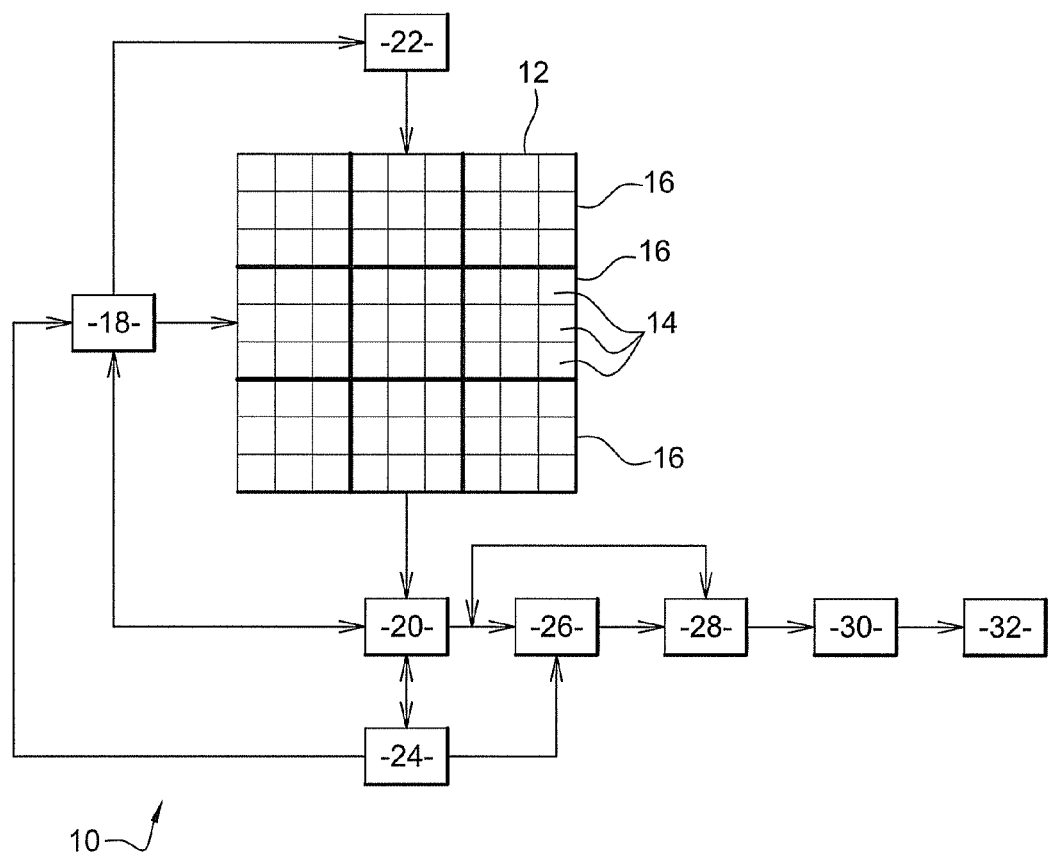
FIG. 1 is a schematic view of a target tracking system according to the invention.

FIG. 1 shows, under the general reference 10, a system for tracking and detecting moving objects in a stream of images delivered by a two-dimensional matrix of bolometers 12, or pixels.

The matrix of pixels 12 comprises n lines and m columns of pixels 14 and is subdivided into N lines and M columns of identical blocks 16 of pixels, or macropixels, where n, m, N and M are predefined positive integers. For example, the macropixels each have dimensions of 3 pixels by 3 pixels or 5 pixels by 5 pixels.

In the following discussion, by way of example, a matrix of 9 pixels by 9 pixels shall be considered, with macropixels of 3 pixels by 3 pixels.

The system 10 comprises an addressing circuit 18 for addressing the matrix 12, line of macropixels by line of macropixels.

The system 10 also comprises a read circuit 20 suitable for reading each macropixel of a line of macropixels addressed by the circuit 18 in high or low resolution mode. More particularly, the low resolution mode readout of a macropixel consists for the read circuit 20 in reading the spatial mean of the pixels thereof.

For this purpose, the system 10 may comprise a binning circuit 22, under the control of an addressing circuit 18, and implementing the spatial averaging of the raw values of the pixels of a macropixel before the latter is read in low resolution mode. For example, the binning circuit 22 conforms to the teachings of document US-A-2004/0095492. A binning circuit is more particularly suitable for a sensor comprising photodiodes like those used to detect visible light.

In the case of a sensor comprising bolometers, use can be made of a circuit 22 suitable for reading a mean of currents passing through a plurality of bolometers, such as a circuit described in the article by Coulombe J entitled "*Variable resolution CMOS current mode active pixel sensor*", Circuits and Systems, Proceedings. ISCAS 2000 Geneva, IEEE, Volume 2, 28-31 May 2000 Page(s): 293-296 vol. 2.

The read circuit 20 is also connected to an addressing circuit 18 for a synchronization of the addressing and the readout of the lines of macropixels employed by these two circuits.

An analysis and timing circuit 24 is also connected to the addressing and readout circuits 18, 20. This circuit 24 controls the timing of the addressing by delivering the address of the line of macropixels to be read to the circuit 18.

The circuit 24 also analyzes, for each macropixel, the result of the low resolution readout thereof and in consequence, controls the addressing and readout circuits 18, 20 for a low or high resolution readout of the macropixel.

More particularly, the analysis and timing circuit 24 activates the high resolution readout of a macropixel when a variation in its spatial mean between two successive readouts thereof is greater than or equal to a predefined threshold value, for example a threshold value equal to 2% of the total dynamic range of the pixels or a threshold value calculated by an adaptative thresholding technique.

Similarly, the analysis and timing circuit 24 deactivates, as required, the high resolution readout of the macropixel when the same variation is lower than said threshold value.

The analysis and timing circuit 24 also controls the addressing and readout circuits 18, 20 to activate the high resolution mode readout of macropixels in the neighborhood of macropixels of which the high resolution mode readout has been activated due to a variation in their spatial mean that is greater than the threshold value. For example, for each of these macropixels, a neighborhood of 3 by 3 macropixels or of 5 by 5 macropixels is read in high resolution mode.

The system 10 also comprises a storage circuit 26, connected to the readout circuit 20 and controlled by the analysis circuit 24. During the activation of the high resolution readout of a macropixel, the analysis and timing circuit 24 controls the storage circuit 26 so that the latter stores the values of the pixels of the macropixel read by the readout circuit 20 the first time after this activation.

The storage circuit 26 therefore memorizes the value of each of the macropixels during their latest activation in high resolution mode, thereby forming a matrix of reference macropixels used subsequently for correcting the high resolution readout.

The system 10 also comprises an analog subtraction circuit 28, connected to the readout circuit 20 and to the storage circuit 26. For each macropixel read in high resolution, the subtraction circuit 28 forms the difference between the values of the pixels of this macropixel read by the readout circuit 20 and the corresponding values stored in the circuit 26.

For each macropixel read in high resolution mode, a value thereof is obtained that is equal to the difference between its uncorrected value, that is the value read by the readout circuit 20, and its reference value stored in the circuit 28.

Preferably, the circuit 26 is formed of an array of capacitors, for example having dimensions equal to those of the matrix 12, and the subtraction circuit 28 is produced in analog form. Thus, the macropixels read in high resolution mode are entirely corrected in analog mode.

The system 10 also comprises an analog-to-digital converter 30 connected to the output of the subtraction circuit 28 and digitizing the difference formed thereby, for subsequent needs, for example for image processing.

A peripheral device 32 (screen, memory, etc.) may also be provided for the display and/or storage of the digitized difference.

Figure 2:
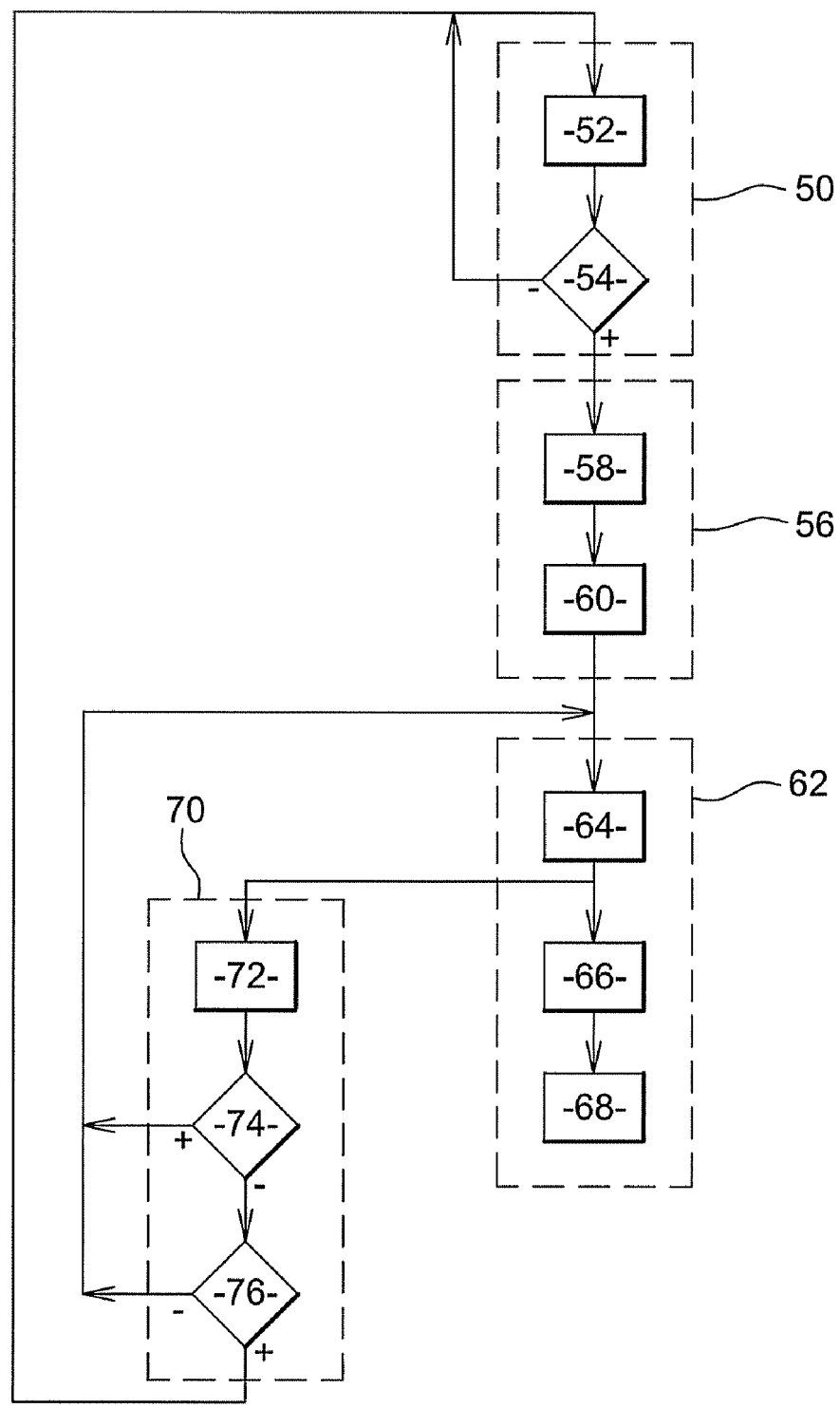
FIG. 2 is a flowchart of the inventive method.

A flowchart of the method implemented by the system described above is shown in FIG. 2. This flowchart concerns the readout of a particular macropixel, the readout of the other macropixels being identical.

A first step of the inventive method is a step 50 of low resolution readout of the macropixel.

This step 50 comprises a substep 52 in which the macropixel is read in low resolution mode, that is, a spatial mean is calculated of the values of its pixels, followed by the readout of a value of a pixel thereof.

During a subsequent substep 54, a test is performed to determine whether a condition for reading this macropixel in high resolution mode is satisfied. This condition is satisfied in particular if the absolute value of the difference between the low resolution value of the macropixel just read and the low resolution value previously stored is greater than the threshold value, in which case a movement is detected in the macropixel. This condition is also satisfied if the macropixel belongs to a neighborhood of a macropixel in which a movement has been detected.

If this is not the case, the substep 54 reloops to the substep 52 in order to continue scrutinizing the occurrence of the satisfaction of the condition for activating high resolution readout mode.

If the test performed in substep 54 is positive, the low resolution step 50 continues via a correction initialization step 56.

This initialization step 56 comprises a substep 58 of high resolution readout of the macropixel, that is a readout of all its pixels, followed by a substep 60 of storage of the pixel values read, thereby forming a reference macropixel.

Once the initialization step 56 is completed, a step 62 of readout of the macropixel in high resolution mode with correction of the noise thereof is then initiated.

This step 62 comprises a substep 64 of readout of the macropixel in high resolution mode. The substep 64 is then followed by a substep 66 in which the difference is formed between the values of the pixels just read and the values of the corresponding pixels of the reference macropixel stored at 60.

The high resolution mode readout step 62 with correction then continues via a substep 68 of conversion of the difference thereby formed to a digital macropixel.

At the same time, a step 70 of verification of the satisfaction of the condition for activating high resolution readout mode is initiated after the substep 64 of high resolution readout mode of the macropixel.

This step 70 comprises a substep of readout of the macropixel in low resolution mode identical to substep 52, and a substep 74 consisting of testing whether the high resolution readout condition is still satisfied, the substep 74 being identical to the substep 54.

If the result of the test performed at 74 is positive, the substep 74 loops to the step 62 for a new high resolution mode readout with correction.

If not, the substep 74 continues via a substep 76 in which a test is performed to determine whether the macropixel must be read in low resolution mode. More particularly, the test at 76 is performed to determine whether at least one neighboring macropixel of the macropixel is in the course of high resolution readout following the detection of a movement therein.

If this is the case, the high resolution mode readout of the macropixel continues by the looping of the substep 76 to the step 62.

If this is not the case, that is, no movement has been detected in the neighborhood of the macropixel, the low resolution mode readout thereof is activated by the looping of the substep 76 to the step 50.

Figure 3:
FIGS. 3 and 4 are examples of images before and after correction according to the inventive method.
Figure 4:
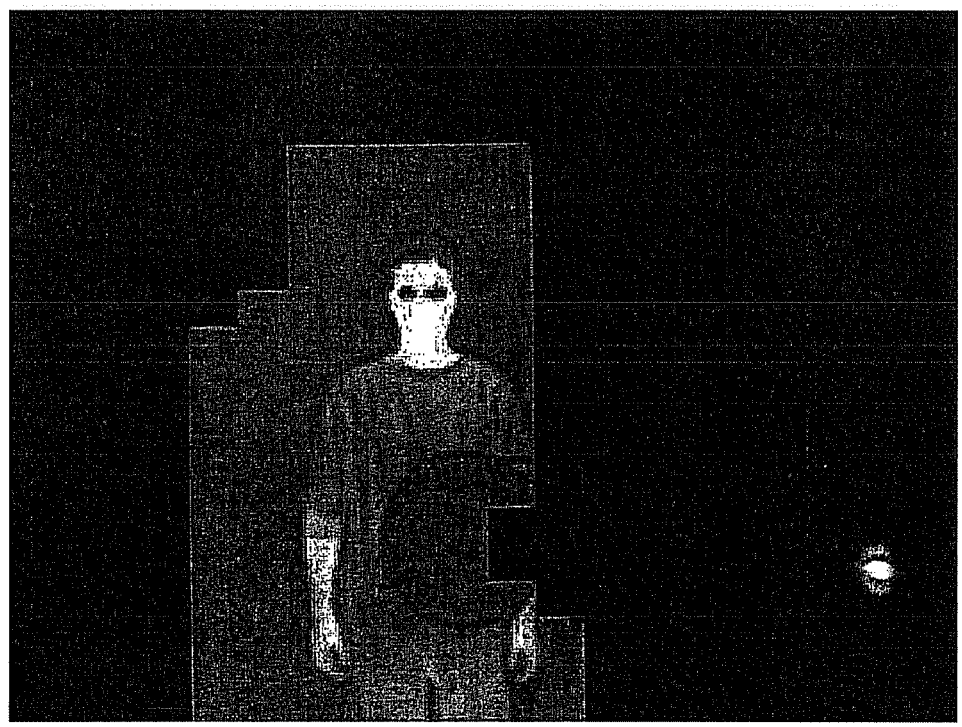

FIG. 3 is an image of a scene issuing from the sensor without any correction. As may be observed, this image is unusable, at least visually. FIG. 4 is an image of the same scene after application of the inventive method, the black blocks corresponding to macropixels in which no movement has been detected.

As may be observed, the macropixels in the neighborhood of a macropixel in which a movement has been detected are automatically read in high resolution mode with a correction according to the invention.

Without such a feature, the macropixels recorded to serve as a reference comprise the image of the moving target, an image which is then extracted from the raw images read subsequently. Thus "ghost" objects may appear, or image motion phenomena in the consecutive corrected images.

The activation of the high resolution readout of a macropixel next to the one in which a movement has been detected (for example a neighborhood of 3×3 or 5×5 macropixels) has the effect, for this neighboring macropixel, of storing a reference macropixel which does not comprise the moving object. The reference macropixel stored thus corresponds exclusively to the background of the scene. Once the target enters this neighboring macropixel, the corrected image obtained for it therefore corresponds substantially exclusively to the image of the moving target. Thus no ghost object or image motion exists. Step by step, due to the permanent recentering of the high resolution window on the object detected and the passage to high resolution of the macropixels upstream of the movement of the object (by the principle of "lighting" the neighboring macropixels), the references are acquired without the presence of the object in the macropixels and hence the appearance of ghost objects is prevented.

The renewal of the reference macropixels is guaranteed here by the movement of the targets themselves. This movement implies a sufficiently uniform activation of the high resolution mode readout so that the reference macropixels stored comprise the noise at the actual time of the high resolution readout.

As an alternative, it is also provided to periodically renew the reference macropixels, for example to take account of very rapid variations in the dispersion of the detection characteristics of the sensor. This may be the case for example if the scene observed is itself subject to very rapid variations in temperature (as for example the sudden entry of a substantially warmer object than the background of the scene, for example), or if the manufacturing technology of the sensor implies such a rapid variation in dispersion.

An embodiment has been described in which the reference macropixels are stored in analog form in a circuit formed for example of an array of capacitors, and in which the analog difference between the macropixels just read and the reference macropixels is stored using an analog-to-digital converter.

As an alternative, the reference macropixels are digitized and stored in a digital memory. Similarly, the macropixels just read are digitized and the difference between them and the reference macropixels is calculated in digital form. This serves in particular to avoid a drift in time of the values of the reference macropixels usually observed when the storage is carried out in analog form (presence for example of leakage in the capacitor array used for analog storage). Storage of the reference macropixels in digital form is particularly useful when the object stagnates in a portion of the scene observed, in which case the renewal of the reference macropixels is infrequent.

Although an application to infrared detection by the use of bolometric sensors has been described, the present invention applies to all types of sensors read in subresolution mode and displaying a dispersion of their detection characteristics.

Thus, the present invention applies to detection in the visible range, for example using a light sensitive semiconductor sensor (photodiode matrix or phototransistor matrix).

The invention claimed is:

1. A method for detecting and tracking moving objects using a two-dimensional matrix of pixels of an image sensor organized into blocks of pixels forming macropixels, the sensor comprising a read circuit for reading each macropixel in one of a high resolution mode and a low resolution mode, wherein a single unique value is generated for all of the pixels of a macropixel in the low resolution mode and an individual value is generated for each pixel in the macropixel in the high resolution mode, the method comprising the steps of:
   determining which of the macropixels of the matrix are read in the high resolution mode and which of the macropixels of the matrix are read in the low resolution mode only, by:
      reading all of the macropixels of the matrix in the low resolution mode;
      detecting the macropixels of the matrix in which a movement is occurring based on values of the macropixels read in the low resolution mode;
      activating/maintaining the high resolution mode for the macropixels in which a movement is occurring;
      activating the high resolution mode for the macropixels in which no movement is occurring and which are located in a neighborhood of the macropixels in which the movement is occurring;
      activating/maintaining the low resolution mode only for the other micropixels of the matrix; and
      reading in high resolution mode the macropixels activated in the high resolution mode;
   storing, for each of the macropixels switching from the low resolution mode to the high resolution, individual pixel values for each pixel of the macropixel read in high resolution mode, thereby forming a reference macropixel for said macropixel;
   correcting each individual pixel value of the macropixel read in the high resolution mode by evaluating a difference between the individual pixel value and the corresponding individual pixel value of the reference macropixel; and
   at least one of storing and displaying the corrected pixel values of each of the macropixels read in the high resolution mode.

2. A method for detecting and tracking moving objects using a two-dimensional matrix of pixels as claimed in claim 1, wherein a movement is detected in the macropixel when the values recorded in two successive readouts of the macropixel read in the low resolution mode vary by more than a predefined threshold.

3. A method for detecting and tracking moving objects using a two-dimensional matrix of pixels as claimed in claim 1, wherein the individual pixel values of the reference macropixel are stored in an array of capacitors and the individual pixel values of the macropixel read in the high resolution mode are analog values, wherein differences are produced in an analog form, and the analog differences are converted to digital values.

4. A method for detecting and tracking moving objects using a two-dimensional matrix of pixels as claimed in claim 1, wherein the individual pixel values of the reference macropixel are digital values and stored in a digital memory and the individual pixel values of the macropixel read in the high resolution mode are digital values and stored in a digital memory, and wherein differences are produced by subtracting the digital values of the reference macropixel from the digital values of the macropixel.

5. A device for detecting and tracking moving objects using a two-dimensional matrix of pixels of an image sensor organized into blocks of pixels forming macropixels, the device comprising:
   means for reading each macropixel in a high resolution mode and in a low resolution mode, wherein a single unique value is generated for all pixels of a macropixel in the low resolution mode and an individual value is generated for each pixel in the macropixel in the high resolution mode, means for determining which of the macropixels of the matrix are read in the high resolution mode and which of the macropixels of the matrix are read in the low resolution mode only, by:
- detecting the macropixels of the matrix in which a movement is occurring based on values of the macropixels read in the low resolution mode;
- activating/maintaining the high resolution mode for the macropixels in which a movement is occurring;
- activating the high resolution mode for the macropixels in which no movement is occurring and which are located in a neighborhood of the macropixels in which a movement is occurring; and
- activating/maintaining the low resolution mode only for the other macropixels of the matrix;

means for correcting each individual pixel value of each macropixel read in the high resolution mode, comprising:
- means for storing individual pixel values of said macropixel read in the high resolution mode at the moment of switching from the low resolution mode to the high resolution mode for reading said macropixel, thereby forming a reference macropixel for said macropixel; and
- means for evaluating a difference between said individual pixel value and the corresponding value of the reference macropixel read in the high resolution mode; and means for at least one of storing and displaying the corrected pixel values of the macropixels read in the high resolution mode.

* * * * *